(12) United States Patent
Leitzmann et al.

(10) Patent No.: US 11,136,526 B2
(45) Date of Patent: Oct. 5, 2021

(54) ANTI-FRICTION LUBRICANT FOR COATING ENGINE PISTONS

(71) Applicant: FEDERAL-MOGUL NURNBERG GMBH, Nuremberg (DE)

(72) Inventors: Dominik Leitzmann, Nuremberg (DE); Monika Blumm, Feucht (DE); Thomas Fuhrmann, Lauf/Peg (DE); Margrit Dannenfeldt, Nuremberg (DE); Achim Adam, Nauheim (DE); Jurgen Reitenspiess, Altdorf (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 16/088,968

(22) PCT Filed: Feb. 22, 2017

(86) PCT No.: PCT/EP2017/054011
§ 371 (c)(1),
(2) Date: Sep. 27, 2018

(87) PCT Pub. No.: WO2017/167505
PCT Pub. Date: Oct. 5, 2017

(65) Prior Publication Data
US 2019/0127657 A1    May 2, 2019

(30) Foreign Application Priority Data

Mar. 30, 2016 (DE) .................. 10 2016 205 199.7

(51) Int. Cl.
| | |
|---|---|
| C10M 169/04 | (2006.01) |
| C10M 111/04 | (2006.01) |
| C09D 161/06 | (2006.01) |
| C10M 103/02 | (2006.01) |
| C10M 103/06 | (2006.01) |
| C10M 107/32 | (2006.01) |
| C10M 125/10 | (2006.01) |
| F02F 3/10 | (2006.01) |
| C08K 3/30 | (2006.01) |
| C08K 3/22 | (2006.01) |
| C08K 3/38 | (2006.01) |
| C10N 10/12 | (2006.01) |
| C10N 10/14 | (2006.01) |
| C10N 30/06 | (2006.01) |
| C10N 40/25 | (2006.01) |
| C10N 50/02 | (2006.01) |

(52) U.S. Cl.
CPC ......... *C10M 169/04* (2013.01); *C09D 161/06* (2013.01); *C10M 103/02* (2013.01); *C10M 103/06* (2013.01); *C10M 107/32* (2013.01); *C10M 111/04* (2013.01); *C10M 125/10* (2013.01); *F02F 3/10* (2013.01); *C08K 2003/2272* (2013.01); *C08K 2003/3009* (2013.01); *C08K 2003/385* (2013.01); *C10M 2201/041* (2013.01); *C10M 2201/0413* (2013.01); *C10M 2201/061* (2013.01); *C10M 2201/062* (2013.01); *C10M 2201/065* (2013.01); *C10M 2201/066* (2013.01); *C10M 2201/0663* (2013.01); *C10M 2209/101* (2013.01); *C10M 2209/1003* (2013.01); *C10M 2209/1013* (2013.01); *C10N 2010/12* (2013.01); *C10N 2010/14* (2013.01); *C10N 2030/06* (2013.01); *C10N 2040/25* (2013.01); *C10N 2050/02* (2013.01)

(58) Field of Classification Search
CPC ... F02F 3/10; C10N 2240/10; C10N 2230/06; C10N 2250/121; C10M 2209/1013; C10M 2209/1003; C10M 2201/0413; C10M 2201/0663; C10M 2201/062
See application file for complete search history.

(56) References Cited

U.S. PATENT DOCUMENTS

| | | | |
|---|---|---|---|
| 5,270,403 A | 12/1993 | Mori | |
| 5,482,637 A | 1/1996 | Rao et al. | |
| 2007/0297704 A1 | 12/2007 | Mayston et al. | |
| 2008/0060603 A1 | 3/2008 | Kuroda et al. | |
| 2009/0230433 A1 | 9/2009 | Yamaguchi | |
| 2011/0268944 A1* | 11/2011 | Adam | F16C 9/00 |
| | | | 428/216 |
| 2012/0103183 A1* | 5/2012 | Jung | C09D 161/06 |
| | | | 92/172 |
| 2012/0118255 A1 | 5/2012 | Jung et al. | |

(Continued)

FOREIGN PATENT DOCUMENTS

| | | |
|---|---|---|
| CN | 101560432 A | 10/2009 |
| DE | 69217400 T2 | 6/1997 |

(Continued)

OTHER PUBLICATIONS

Feng, Xiaozhong et al., Polymer materials, Harbin Institute of Technology Press, Nangang District, Harbin City, China, Published Feb. 2007, ISBN 978-7-5603-2467-8, Section 3.4, p. 280.

*Primary Examiner* — Vishal V Vasisth
(74) *Attorney, Agent, or Firm* — Robert L. Stearns; Dickinson Wright, PLLC

(57) ABSTRACT

A coating composition for the piston of an internal combustion engine comprises 10-30 wt. % of phenolic resin, 10-30 wt. % of epoxy resin, 10-30 wt. % of at least one solid lubricant selected from the group consisting of graphite, $MoS_2$, $WS_2$ and BN, and 5-30 wt. % of $Fe_2O_3$ particles.

8 Claims, No Drawings

(56) References Cited

U.S. PATENT DOCUMENTS

| | | |
|---|---|---|
| 2013/0220115 A1 | 8/2013 | Kantola et al. |
| 2017/0138396 A1 | 5/2017 | Latham et al. |
| 2017/0234264 A1 | 8/2017 | Hanke et al. |
| 2019/0062889 A1 | 2/2019 | Nakano et al. |

FOREIGN PATENT DOCUMENTS

| | | |
|---|---|---|
| DE | 19916201 C1 | 9/2000 |
| DE | 102008055194 A1 | 7/2010 |
| DE | 102009002716 A1 | 11/2010 |
| DE | 102010047279 A1 | 5/2012 |
| DE | 102013204577 A1 | 10/2014 |
| DE | 102013206799 A1 | 10/2014 |
| JP | S6072952 A | 4/1985 |
| JP | 2008056750 A | 3/2008 |
| JP | 2009155720 A | 7/2009 |
| JP | 2012514170 A | 6/2012 |
| JP | 2012525457 A | 10/2012 |
| JP | 2014532845 A | 12/2014 |
| JP | 2017528590 A | 9/2017 |
| RU | 2211260 C1 | 8/2003 |
| WO | 2004113749 A1 | 12/2004 |
| WO | 2013063342 A1 | 5/2013 |

\* cited by examiner

ANTI-FRICTION LUBRICANT FOR COATING ENGINE PISTONS

This application is a 371 of PCT/EP2017/054011, filed Feb. 22, 2017.

BACKGROUND

1. Technical Field

The invention relates to a coating composition for the piston of an internal combustion engine, in particular for the piston skirt.

2. Related Art

To decrease $CO_2$ emissions of motor vehicles, it is inter alia necessary to reduce the energy loss in the power train. A substantial amount of energy loss is caused by the friction between piston skirt and cylinder.

Coatings for the piston skirt must therefore have a low friction coefficient. In order to guarantee a sufficient service life of the coating, the coating must have a high wear resistance at the same time. A high resistance or wear resistance is in particular, required for operational states of the engine having a high degree of wear due to repeated cold starts, for example. The passage of the coating in the load-bearing regions of the piston skirt is in particular to be avoided.

Various piston coatings which can be used for this purpose are known in the prior art.

DE 10 2010 047 279 A1, for example, describes a piston coating consisting of a low-friction outer running-in layer and a low-wear inner layer. The inner layer consists of a polymer matrix, in which ceramic particles, aramide fibers and/or carbon fibers are embedded, and the outer layer consists of a polymer matrix in which solid lubricant particles are dispersed.

In the coating described in DE 10 2009 002 716 A1, solid lubricant particles and carbon fibers are used in a matrix based on phenolic resin.

DE 10 2008 055 194 A1 discloses a sliding element with a substrate on which at least one sliding layer is applied. This sliding layer is an antifriction lacquer comprising a cross-linkable binder, a high-melting thermoplast or a duroplast as a matrix. This matrix contains $Fe_2O_3$.

SUMMARY

The object of this invention is to provide a coating composition for a piston, which is superior to the known coatings and optimized for the use on a piston skirt. In particular, a coating composition is to be provided which is easily manufactured, easily applied by means of a printing method and has good friction and wear properties.

It was surprising that the composition according to the invention results in a coating, the properties of which, for example flexibility, adhesion, wear resistance and friction coefficient, are optimally adapted to the conditions of the piston. The composition according to the invention can furthermore be produced in a simple and cost-effective manner and can be easily applied to the piston by means of a printing method. These properties are achieved by using specific amounts of components (phenolic resin, epoxy resin, solid lubricant and $Fe_2O_3$). Thus, for example, a lower amount of $Fe_2O_3$ leads to a deterioration of the properties, such as lower wear resistance.

The composition according to the invention comprises a preferably thermally curable phenolic resin as a matrix material. Thermally curable phenolic resins, so-called resols, can cross-link via hydroxyl groups, as opposed to the novolaks. Preferably, phenolic resins with an average molecular weight of 500 to 1500 g/mol are used.

As a further matrix material, the composition according to the invention comprises an epoxy resin. The addition of the epoxy resin increases the adhesion of the layers to metallic surfaces as well as the flexibility thereof. For this purpose, an epoxy resin based on bisphenol A with a molecular weight of 2000 to 4000 g/mol and an epoxy equivalent of >700 g/mol is preferably used.

With this invention, these resins are preferred to be used as a solution in a solvent. The selection of the solvent is largely directed at the type of coating applied and has no influence on the properties of the hardened coating. The coating of pistons is often undertaken by means of the screen printing method. Solvents with a high boiling point are particularly preferred for this application. Suitable solvents are, for example, butyl glycol acetate, ethyl glycol acetate, dipropylene glycol, dipropylene glycol butyl ether and butoxy ethanol.

The phenolic resin and/or epoxy resin can alternatively also be used as a water-dilutable dispersion. With the invention, the polymer dispersions used can be provided in a diluted form in pure water or water-solvent compositions. Co-solvents can be, for example, butyl glycol, propylene glycol, dipropylene glycol n-butylether or also white spirit. The water/solvent ratio is preferably of 1:2 or most preferably 1:1 or more.

Phenolic resin as well as epoxy resin are used in an amount of 10 to 30 percent by weight, based on the total composition.

In a particularly preferred embodiment, the composition according to the invention contains phenolic resin and epoxy resin in a ratio of 1:3 to 3:1.

Graphite, $MoS_2$, $WS_2$, BN or mixtures thereof are added to the composition as solid lubricant(s). A mixture of graphite and $MoS_2$ is preferably used. The grades of solid lubricants generally known to the skilled person can be used. Preferably, graphite with an average grain size of 1 to 100 µm, most preferably of 5 to 50 µm, is used. Preferably, molybdenum disulfide with an average grain size of 0.1 to 50 µm, most preferably of 0.1 to 10 µm, is used. Preferably, boron nitride in its hexagonal modification with an average grain size in the range of 1 to 100 µm, most preferably in a range of 1 to 20 µm, is used.

The grain size of the solid lubricants mentioned above can be measured by means of the scattered light method in a manner known to the skilled person.

The solid lubricant or the solid lubricant composition is used in an amount of 10 to 30 percent by weight, preferably 15 to 20 percent by weight, based on the composition in total.

As a further component, the composition according to the invention comprises $Fe_2O_3$ particles in an amount of 5 to 30 percent by weight, preferably 10 to 15 percent by weight.

In addition to the components stated above, the composition can further comprise additives and auxiliaries such as, for example, flow-control additives, defoamers, wetting agents, dispersing agents or also rheological additives. These kinds of additives are usually used in piston coatings and known to the skilled person.

The coating composition according to the invention can be used for pistons of aluminum or steel.

Applying the coating composition on the piston can be done by known methods for applying coatings to surfaces. This is preferably done using screen printing or spraying processes. First, the not-yet cross-linked coating composition is applied to the surface to be coated. The coating composition is then cured or cross-linked. Curing or cross-linking can be performed thermally or by means of radiation, for example UV radiation or IR radiation. It is preferably undertaken thermally or by means of IR radiation.

The individual components of the composition according to the invention advantageously interact such that the flexibility, the adhesion to the piston, the wear-resistance, the friction coefficient and the applicability are optimally adapted by a printing process to the conditions on the piston.

The invention claimed is:

1. A piston of an internal combustion engine, comprising, at least in sections of the piston, a coating made from a composition which consists of, based on the total composition:
  a) 10 to 30 percent by weight of phenolic resin;
  b) 10 to 30 percent by weight of epoxy resin;
  c) 10 to 30 percent by weight of at least one solid lubricant selected from the group consisting of graphite, $MoS_2$, $WS_2$ and BN;
  d) 5 to 30 percent by weight of $Fe_2O_3$ particles; and
  e) solvents and additives.

2. A piston according to claim 1, wherein the at least one solid lubricant includes graphite and $MoS_2$.

3. A piston according to claim 1, comprising the solvents and additives in an amount of 20 to 60 percent by weight, based on the total composition.

4. A piston according to claim 1, comprising 15 to 20 percent by weight of the at least one lubricant(s).

5. A piston according to claim 1, comprising 10 to 15 percent by weight of the $Fe_2O_3$ particles.

6. A piston according to claim 1, wherein the ratio of the phenolic resin to the epoxy resin is 1:3 to 3:1.

7. A piston according to claim 1, comprising 10 to 30 percent by weight of the $Fe_2O_3$ particles.

8. A piston according to claim 1, wherein the coating is disposed on a skirt of the piston.

* * * * *